Figure 1:
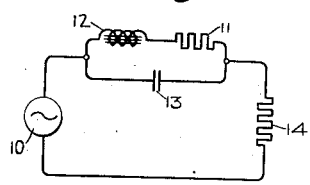

March 12, 1935.   C. G. SUITS   1,994,326
ELECTRIC CIRCUIT CONTROL MEANS
Filed May 26, 1932

Inventor:
Chauncey G. Suits,
by Charles E. Tulla
His Attorney.

Patented Mar. 12, 1935

1,994,326

UNITED STATES PATENT OFFICE 1,994,326

ELECTRIC CIRCUIT CONTROL MEANS

Chauncey G. Suits, Schenectady, N. Y., assignor to General Electric Company, a corporation of New York Application May 26, 1932, Serial No. 613,697

15 Claims. (Cl. 175—320)

My invention relates to electric circuit control means and more particularly to current sensitive electric circuit relay mechanisms.

The control and regulation of electric circuits by means of a relay energized from an electric circuit having a non-linear volt-ampere characteristic which is characterized by a sudden change in current at a critical voltage is described and claimed in my copending applications Serial No. 510,246, filed January 21, 1931, and Serial No. 613,695, filed May 26, 1932 which are assigned to the assignee of the present application. In cases heretofore where the useful properties of the non-linear circuit and relays employing these circuits have been used for the regulation or control of the magnitude of the current in an alternating current system, a voltage has been derived from a resistance traversed by the variable current, and the voltage sensitive non-linear circuit and relay are energized by this derived voltage. The power loss in this resistance, regarded as a voltage source for the relay, is necessarily large compared to the losses in the relay proper with the result that for sufficient sensitivity the system is relatively inefficient.

In referring to the properties of circuits, sensitive is used herein to denote the ratio between the percentage change in the dependent quantity that follows from a certain percentage change in the independent quantity. Thus a current sensitive circuit is one in which the percentage change in the control quantity, voltage, is large for a small percentage change in the current to be controlled.

It is an object of my invention to provide a new and improved current sensitive electric circuit control means which is economical and simple in structure, sensitive and accurate in operation, and readily adjustable for different conditions and applications.

It is another object of my invention to provide an improved current selective bridge circuit suitable for regulation and control of electric circuits in accordance with variations in current in a sensitive and reliable manner.

It has been known for some time that certain unusual resonance effects occur in circuits employing capacitances in combination with inductances having closed iron cores which are adapted to saturate magnetically. Circuits of this type are with few exceptions distinguished by non-linear volt-ampere characteristics and are used in carrying out my invention. Throughout the specification and claims "non-linear" element, or circuit, will be used to designate an element, circuit, or branch circuit having a non-linear volt-ampere characteristic for effective values of alternating current.

If a circuit comprising a series connected resistance, capacitance and saturable inductance is properly dimensioned it will be observed that for a gradually increasing voltage of constant frequency, the effective current is not proportional to the voltage but increases critically at a certain voltage. Similarly, for a gradually decreasing voltage at constant frequency the effective current decreases critically at a certain voltage. For convenience I refer to the voltage at which the sudden increase of current takes place as the "resonant" voltage and the voltage at which the sudden decrease of current takes place as the "dissonant" voltage.

When the same circuit elements of the series circuit just discussed are employed in parallel combination, it is found that in general the properties of the circuit are similar to those of the series circuit except that the functions of current and voltage are reversed. A large change in voltage across the parallel branch takes place for a relatively small change in the total current to this branch. By analogy to the series circuit, I refer to this critical value of current for which the voltage suddenly increases as the "resonant" current and to the critical value of current for which the voltage suddenly decreases as the "dissonant" current.

My invention will be better understood from the following description taken in connection with the accompanying drawing and its scope will be pointed out in the appended claims.

Figure 2:
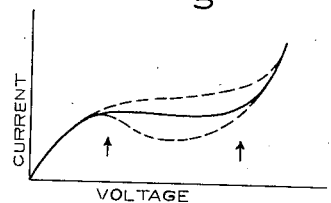
Figure 3:
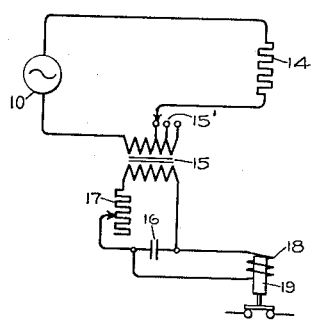
Figure 4:
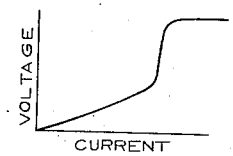
Figure 5:
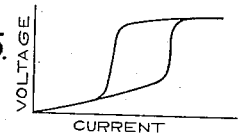
Figure 6:
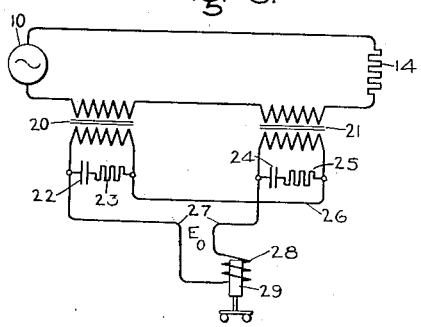
Figure 7:
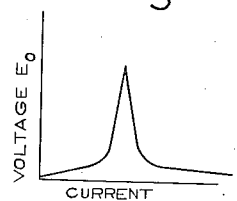

In the drawing Fig. 1 is an elementary circuit diagram of a parallel type of non-linear circuit for more clearly explaining my invention; Fig. 2 is a diagram illustrating characteristic volt-ampere curves of the parallel non-linear circuit of Fig. 1; Fig. 3 is a diagrammatic representation of a simple embodiment of my invention; Figs. 4 and 5 are curves for explaining the characteristics and operating phenomena of the embodiments of my invention; Fig. 6 is a diagrammatic representation of another embodiment of my invention for providing a current selective bridge, and Fig. 7 is a curve for illustrating an operating characteristic of the embodiment of my invention illustrated in Fig. 6.

Referring to Figs. 1 and 2 of the drawing, 10 indicates a source of alternating voltage which is connected to energize a parallel non-linear circuit consisting of a branch circuit comprising a series connected resistance 11 and a saturable inductance 12 connected in parallel relation with another branch circuit comprising a capacitance 13 across the source 10 through a load circuit 14. When the load current is plotted as a function of the voltage the volt-ampere characteristics of Fig. 2 are obtained. If the circuit constants are varied the curve may take the forms illustrated by the dotted portions. The network of circuit elements shown in Fig. 1 has been described in the prior art and has been previously used because of its constant current properties, since in the region indicated by the arrows the load current may remain substantially constant in spite of variations in line voltage. The application of this system for constant current regulation has been in a voltage limited system as contrasted with a current limited system, i. e., a system or circuit in which the voltage drop across the parallel network is small compared to the total voltage applied to the circuit.

In accordance with my invention I employ a parallel non-linear circuit in a current limited system so as to utilize the current as the variable quantity for producing rapid voltage changes across the non-linear network in a manner to actuate relay mechanism or other translating devices. In carrying out my invention I find that it is desirable to have the total voltage across the relay relatively small which requires that the capacitance must be large in microfarad rating. Since this requirement makes it necessary to employ capacitors at uneconomically low voltage, it is preferable to employ a transformer for changing a high voltage, low capacitance unit to a low voltage, high capacitance unit of identical volt-ampere size. It is also found convenient, to use this same transformer as the saturating inductance so that no additional equipment is required. In Fig. 3 I have shown an embodiment of my invention in which 10 is the source of current for energizing the load circuit 14. In series relation with the load circuit I connect a current transformer 15 which is dimensioned in core structure to saturate within the operating range of the current to be controlled, and is provided with means to adjust the inductance characteristic such as by the adjustable taps 15' as illustrated in the drawing. A condenser 16 is connected in series relation with a resistance 17 across the secondary winding of the transformer 15. The resistance 17 is preferably made adjustable in order to calibrate the relay mechanism. The relay mechanism, which may be any one of a variety of forms, as for example a solenoid 18 and armature 19, is connected to be energized in parallel with either the primary winding of the transformer 15 or the secondary windings of the transformer 15 as shown. The solenoid 18 may also be connected in series relation with the secondary winding without departing from my invention in its broader aspects.

The properties of the relay arrangement illustrated in Fig. 3 are similar in many respects to those of the analogous voltage sensitive series circuit which are described in my aforementioned copending applications. These properties are shown by the curves of Figs. 4 and 5.

In Fig. 4 I have shown a curve illustrating the voltage of the secondary winding of transformer 15 plotted as a function of the current in the primary winding. It may be seen that the voltage varies in a critical manner with the current in the primary winding. For a given transformer and capacitor there is a value of resistance for which the characteristic of Fig. 5 is single valued; that is, identical critical current values for increasing and decreasing current so that the resonant and dissonant currents have the same value. However for resistances less than this critical value, the resonant current is different from the dissonant current. This property is shown in Fig. 5 where similar variables have been plotted. Thus the difference between the "pick-up" and "drop-out" voltage of the current relay is adjustable by a change in the resistance 17. I have further found that the resonant current is relatively insensitive to changes in the resistance 17 whereas the dissonant current changes greatly when resistance 17 is varied. The performance is similar to the voltage sensitive series circuit in this respect. The value of current at which the circuit becomes resonant depends upon all the circuits constants but is most easily adjustable by a change in the inductance such as by a change in the number of turns of the primary winding of transformer 15. When this change is made, the resonant current and dissonant current vary inversely as the number of turns.

It should be noted that since only the capacitor and reactor difference current appears in the primary winding of the transformer 15, the volt-ampere burden carried by this winding is relatively small. Hence, the size of the parts and the volt-amperes required to energize a solenoid and armature relay mechanism differ in no important respect from that required for the voltage sensitive series circuit.

In Fig. 6 I have illustrated an embodiment of my invention in a bridge combination which is adapted to operate as a current selective device. The illustrated embodiment utilizes two circuits of the form shown in Fig. 3. The source 10 is connected to energize a load circuit 14. In series relation with the load circuit I connect transformers 20 and 21. A capacitance 22 and a resistance 23 are connected across the secondary winding of transformer 20, and a capacitance 24 and resistance 25 are connected across the secondary winding of transformer 21. One set of corresponding terminals of the secondary winding of transformers 20 and 21 are interconnected by the conductor 26, and the output circuit 27 is connected across the remaining set of corresponding terminals of the secondary winding. The output circuit is connected to energize a suitable electroresponsive device as for example a relay having an operating winding 28 and an armature member 29. When the networks 22—23 and 24—25 are differentially connected with respect to winding 28, as shown, the output voltage $E_0$, applied to the winding 28 varies in the manner shown in Fig. 7 where it will be observed the relay may be made to pick-up for a small change in current and drop-out following an additional small change in current. This characteristic is responsive to wide adjustment through a change in circuit constants.

While I have shown and described particular embodiments of my invention it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, an electric circuit, means comprising a plurality of impedances arranged in a network and connected in series relation with said circuit such that a voltage of said network varies a large amount relative to the change in total current to said network, and an electric translating device connected in parallel relation with one of said impedances.

2. In combination, an electric circuit, a parallel-type non-linear circuit comprising a saturable inductance in parallel relation with a capacitance connected in series relation with said electric circuit, and an electric translating device connected in parallel relation with said non-linear circuit.

3. In combination, an electric circuit, an electric relay, and means for energizing said relay comprising a parallel type of non-linear circuit connected in parallel relation with said relay and in series relation with said electric circuit, said non-linear circuit being adjusted to change abruptly the energization of said relay at a critical value of current in said electric circuit.

4. In combination, an electric circuit comprising a network of parallel connected impedances having a non-linear volt-ampere characteristic and adjusted to provide a voltage component across said network which is small relative to the voltage applied to said circuit, and a translating circuit connected in parallel relation with one of said impedances so as to be energized in accordance with an electrical characteristic of said non-linear circuit.

5. In combination, an electric circuit, a saturable transformer having a primary winding connected in said circuit and being provided with a secondary winding, a series connected capacitance and resistance connected in parallel relation with said secondary winding, and a translating device connected in parallel relation with said capacitance.

6. In combination, an electric circuit, a saturable transformer having a primary winding connected in said circuit and being provided with a secondary winding, means for adjusting the inductance of said transformer, a capacitor and a resistance connected in series relation across said secondary winding, means for varying said resistance, and a relay connected across said capacitor.

7. In combination, an electric circuit, a saturable transformer having a primary winding connected in said circuit and being provided with a secondary winding, said primary winding being provided with taps for adjusting the inductance of said transformer, a capacitor connected in parallel relation with said secondary winding, an adjustable resistance connected in series relation with said capacitor, and a relay having a winding connected across said capacitor.

8. In combination, an electric circuit, means comprising a pair of electric networks connected in series relation with said circuit and each comprising a plurality of impedance elements so dimensioned that each network provides a voltage which varies a large amount relative to the change in total current to each network, and an electro-responsive device connected to be energized in accordance with the difference between said network voltages.

9. In combination, an electric circuit, a pair of parallel-type non-linear circuits connected in series relation with said electric circuit, each of said non-linear circuits comprising a saturable inductance in parallel relation with a capacitance, a translating device, and means for connecting said translating device with said non-linear circuits so as to be energized in accordance with the difference between the voltages of said non-linear circuits.

10. In combination, an electric circuit, a current selective bridge circuit connected in said electric circuit and comprising two networks each including a parallel type non-linear circuit, said bridge circuit having output terminals, an electric winding, and means interconnecting the output terminals of said bridge circuit and said electric winding.

11. In combination, an electric circuit, a pair of saturable transformers having primary windings connected in series relation with said electric circuit and each being provided with a secondary winding, a capacitor and a resistor connected across each of said secondary windings, and an electric winding connected to be energized in accordance with the voltage between corresponding terminals of said capacitors.

12. In combination, an alternating current circuit, a non-linear impedance network connected in said circuit and including a saturable inductance element connected in parallel relation with a capacitance element, said inductance element and said capacitance element being so proportioned that the current in said alternating current circuit is substantially independent of changes in voltage across said network, the voltage across said network is small relative to the total voltage applied to said circuit and the voltage of said network changes abruptly a relatively large amount at a critical value of current in said alternating current circuit, and an electric translating device connected in parallel relation with one of said elements.

13. In combination, an alternating current circuit, a translating device, and means including a parallel-type non-linear resonant circuit connected in series relation with said alternating current circuit and to said translating device for abruptly decreasing the energization of said translating device upon an increase of current to said non-linear circuit above a predetermined value.

14. In combination, an alternating current circuit, a translating device, and means having a non-linear volt-ampere characteristic interconnecting said alternating current circuit and said translating device for abruptly increasing the energization of said translating device at a critical value of current in said alternating current circuit and abruptly decreasing the energization of said translating device upon an increase of current in said circuit above said critical value.

15. In combination, an electric circuit, a pair of parallel-type non-linear circuits connected in series relation with said circuit and each including a saturable inductance and a parallel connected capacitance, the inductance and capacitance of each of said non-linear circuits being so proportioned that a branch voltage of said pair of non-linear circuits increases abruptly at a critical value of current in said electric circuit and decreases abruptly at a second critical value of current in said electric circuit which is higher than said first mentioned critical value of current.

CHAUNCEY G. SUITS.